United States Patent
Kawasaki

(10) Patent No.: US 9,481,552 B2
(45) Date of Patent: Nov. 1, 2016

(54) MOVING HANDRAIL FOR PASSENGER CONVEYOR, AND DEVICE FOR MANUFACTURING MOVING HANDRAIL FOR PASSENGER CONVEYOR

(75) Inventor: Atsushi Kawasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/416,408

(22) PCT Filed: Aug. 13, 2012

(86) PCT No.: PCT/JP2012/070615
§ 371 (c)(1),
(2), (4) Date: Jan. 22, 2015

(87) PCT Pub. No.: WO2014/027393
PCT Pub. Date: Feb. 20, 2014

(65) Prior Publication Data
US 2015/0210512 A1  Jul. 30, 2015

(51) Int. Cl.
*B66B 23/24* (2006.01)
*B66B 31/02* (2006.01)
*B29C 65/02* (2006.01)

(52) U.S. Cl.
CPC ............ *B66B 23/24* (2013.01); *B66B 31/02* (2013.01); *B29C 65/02* (2013.01)

(58) Field of Classification Search
CPC .............................. B66B 23/24; B66B 31/02
See application file for complete search history.

(56) References Cited

U.S. PATENT DOCUMENTS

| 3,740,799 A | 6/1973 | Earle | |
| 6,761,259 B1 * | 7/2004 | Onodera | B66B 23/24 198/335 |
| 7,083,037 B2 * | 8/2006 | Durrer | B29C 65/5042 198/335 |
| 8,006,823 B2 * | 8/2011 | Holzner | B66B 23/24 198/337 |
| 8,186,498 B2 * | 5/2012 | Kawasaki | B66B 23/24 198/337 |

(Continued)

FOREIGN PATENT DOCUMENTS

| EP | 2 159 184 A1 | 3/2010 |
| JP | 2001-240358 | 9/2001 |

(Continued)

OTHER PUBLICATIONS

International Search Report Issued Nov. 13, 2012 in PCT/JP12/070615 Filed Aug. 13, 2012.

(Continued)

*Primary Examiner* — Thomas Randazzo
(74) *Attorney, Agent, or Firm* — Oblon, McClelland, Maier & Neustadt, L.L.P

(57) ABSTRACT

An endless moving handrail for a passenger conveyor is formed by heating and connecting together both end portions of a handrail developed body with a connection die. The handrail developed body includes a core body that is made of a thermoplastic elastomer and has a substantially C-shaped cross section, a tensile body arranged inside the core body along a longitudinal direction of the core body, and a canvas arranged on an inner surface of the core body. In the moving handrail for a passenger conveyor, both the end portions of the handrail developed body heated with the connection die are formed as a handrail connection section. A bending stiffness of the handrail connection section is reduced from a longitudinal intermediate portion toward a longitudinal outer side of the handrail connection section.

7 Claims, 5 Drawing Sheets

(56) References Cited

U.S. PATENT DOCUMENTS

| | | | |
|---|---|---|---|
| 8,323,544 B2 * | 12/2012 | Haider | ................ B29C 47/0021 198/337 |
| 2005/0011735 A1 | 1/2005 | Durrer et al. | |
| 2010/0181164 A1 | 7/2010 | Kawasaki et al. | |

FOREIGN PATENT DOCUMENTS

| | | | | |
|---|---|---|---|---|
| JP | 2001240358 A | * | 9/2001 | ............. B66B 31/02 |
| JP | 2001-328790 | | 11/2001 | |
| JP | 3521234 | | 4/2004 | |
| JP | 2004-224504 | | 8/2004 | |
| JP | 2007-511710 | | 5/2007 | |
| JP | 2009-161326 | | 7/2009 | |
| JP | 2009161326 A | * | 7/2009 | ............. B66B 23/24 |
| JP | 4374257 | | 12/2009 | |
| JP | 2012-046269 | | 3/2012 | |
| JP | 2012-46269 | | 3/2012 | |
| JP | 2012046269 A | * | 3/2012 | ............. B66B 23/24 |
| KR | 10-2007-0059052 | | 6/2007 | |
| WO | 2006-087801 | | 8/2006 | |
| WO | 2009-001456 | | 12/2008 | |

OTHER PUBLICATIONS

German Office Action issued in Application No. 11 2012 006 807.6 on Jun. 29, 2016 (w/ English translation).
Korean Office Action issued in Application No. 10-2015-7003255 on Aug. 8, 2016 (w/ English translation).

* cited by examiner

MOVING HANDRAIL FOR PASSENGER CONVEYOR, AND DEVICE FOR MANUFACTURING MOVING HANDRAIL FOR PASSENGER CONVEYOR

TECHNICAL FIELD

The present invention relates to a moving handrail for a passenger conveyor, which is to be used in a passenger conveyor (such as an escalator and a moving walkway), and to a device for manufacturing a moving handrail for a passenger conveyor.

BACKGROUND ART

Hitherto, there has been known a technology of manufacturing an endless moving handrail for a passenger conveyor by connecting together both end portions of a handrail main body having a predetermined length. In the handrail main body, a tensile body for reinforcement is provided inside a core body that is made of a thermoplastic elastomer and has a substantially C-shaped cross section, and a canvas is provided on the inner surface of the core body. When the moving handrail for a passenger conveyor is manufactured, in general, under a state in which both end portions of the handrail main body are brought into contact with each other, both the end portions of the handrail main body are arranged inside a predetermined connection die. After that, both the end portions of the handrail main body are heated with the connection die, to thereby connect both the end portions of the handrail main body to each other (see Patent Literature 1).

CITATION LIST

Patent Literature

[PTL 1] WO 09/001456

SUMMARY OF INVENTION

Technical Problems

When both the end portions of the handrail main body are connected to each other by being heated with the connection die, the thermoplastic elastomer of the core body, which has melted by being heated with the connection die, penetrates through the canvas to be cured. Thus, in the moving handrail for a passenger conveyor, the bending stiffness of a connection section that is subjected to heating during manufacture is higher than the bending stiffness of an unheated part. Therefore, in the related-art moving handrail for a passenger conveyor, the bending stiffness drastically changes at a boundary between the connection section that is subjected to heating during manufacture and the unheated part. In view of this, when the moving handrail for a passenger conveyor is bent, local deformation (kink) or local stress concentration may occur at the boundary between the connection section and the unheated part, which may shorten the life of the moving handrail for a passenger conveyor.

Further, at the connection section of the moving handrail, in order to reinforce the connection section, it is conceivable to overlap the end portions of the plate-like tensile body in the thickness direction of the tensile body. However, in this case, an overlapped part is generated in the tensile body, and hence the bending stiffness of the connection section is further increased.

Further, the following structure is also conceivable at the connection section of the moving handrail. Inclined surfaces, which incline with respect to the width direction of the plate-like tensile body, may be formed on both the end portions of the tensile body, and the end portions of the tensile body may be overlapped with each other in the width direction of the tensile body by mating the inclined surfaces together. However, in this case, additional charging of a resin or pouring of an adhesive is carried out so as to enhance the connection strength of the end portions of the tensile body. Therefore, also in this case, the bending stiffness of the connection section of the moving handrail is further increased.

Still further, it is conceivable to reinforce the connection section of the moving handrail by covering a boundary between the end portions of the canvas, which is generated between both the end portions of the handrail main body, with reinforcement fabric. However, the bending stiffness of the connection section is further increased by the reinforcement fabric, and hence the difference in bending stiffness is enlarged at the boundary between the connection section and the unheated part. In particular, in this case, the thermoplastic elastomer is cured while penetrating through both of the canvas and the reinforcement fabric, which are overlapped with each other. Thus, the difference in bending stiffness is extremely increased between the connection section and the unheated part.

The present invention has been made in order to solve the above-mentioned problems, and has an object to obtain a moving handrail for a passenger conveyor and a device for manufacturing a moving handrail for a passenger conveyor that are capable of achieving a longer life.

Solution to Problems

According to one embodiment of the present invention, there is provided a moving handrail for a passenger conveyor, which has an endless structure formed by heating and connecting together both end portions of a handrail developed body into a handrail connection section with a connection die, the handrail developed body including: a core body that is made of a thermoplastic elastomer and has a substantially C-shaped cross section; a tensile body arranged inside the core body along a longitudinal direction of the core body; and a canvas arranged on an inner surface of the core body, the handrail connection section having a bending stiffness that is reduced from a longitudinal intermediate portion toward a longitudinal outer side of the handrail connection section.

Further, according to one embodiment of the present invention, there is provided a device for manufacturing a moving handrail for a passenger conveyor, the device being configured to manufacture an endless moving handrail for a passenger conveyor by heating and connecting together both end portions of a handrail developed body, the handrail developed body including: a core body that is made of a thermoplastic elastomer and has a substantially C-shaped cross section; a tensile body arranged inside the core body along a longitudinal direction of the core body; and a canvas arranged on an inner surface of the core body, the device including a connection die for heating and connecting together both the end portions of the handrail developed body, the connection die including: an inner die to be inserted on an inner side of the handrail developed body so as to cover a boundary between both the end portions of the handrail developed body; and an outer die for collectively surrounding the handrail developed body and the inner die, in which a heating temperature when both the end portions of the handrail developed body are connected to each other is reduced from a longitudinal intermediate portion toward a longitudinal outer side of the inner die.

Advantageous Effects of Invention

According to the one embodiment of the present invention, with the moving handrail for a passenger conveyor and the device for manufacturing a moving handrail for a passenger conveyor, the difference between the bending stiffness of the handrail connection section and the bending stiffness of parts on both sides of the handrail connection section may be reduced at both the end portions of the handrail connection section, and the bending stiffness may be prevented from being drastically changed at the boundary between the handrail connection section and the parts on both sides thereof. In this manner, the moving handrail may have a longer life.

DESCRIPTION OF EMBODIMENTS

Now, exemplary embodiments of the present invention are described with reference to the drawings.

First Embodiment

Figure 1:
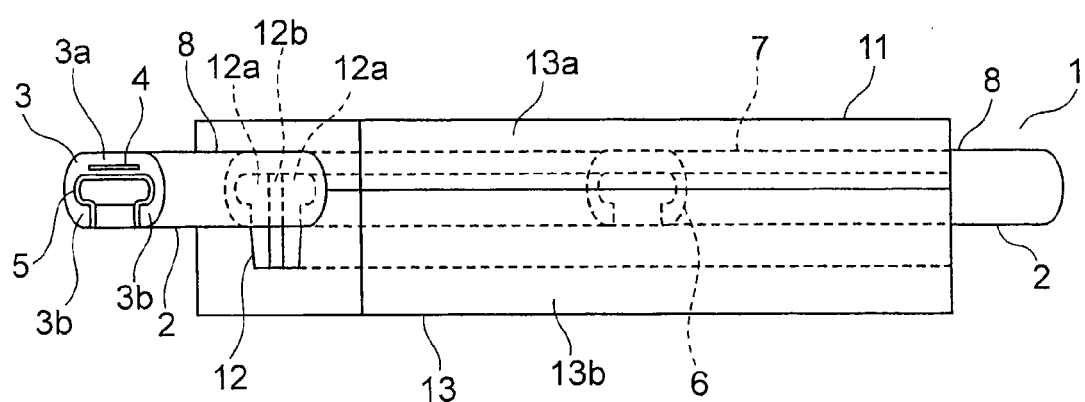
FIG. 1 is a configuration diagram illustrating a state in which a moving handrail for a passenger conveyor according to a first embodiment of the present invention is manufactured.

FIG. 1 is a configuration diagram illustrating a state in which a moving handrail for a passenger conveyor according to a first embodiment of the present invention is manufactured. In FIG. 1, a moving handrail for a passenger conveyor (hereinafter simply referred to as "moving handrail") 1 is an endless handrail formed by heating and connecting together both end portions of a handrail developed body 2 having a predetermined length. The handrail developed body 2 includes a core body 3 that is made of a thermoplastic elastomer and has a substantially C-shaped cross section, a tensile body 4 provided inside the core body 3 along the longitudinal direction of the core body 3, for reinforcing the handrail developed body 2, and a canvas 5 provided on the inner surface of the core body 3.

The core body 3 includes a flat portion 3a extending along the longitudinal direction of the handrail developed body 2, and a pair of curved portions 3b provided at both widthwise end portions of the flat portion 3a. The core body 3 has a substantially C-shaped cross section by the flat portion 3a and the pair of curved portions 3b. The core body 3 may have a single layer structure, or may have a multi-layer structure.

The tensile body 4 is continuously provided inside the flat portion 3a of the core body 3 along the entire length of the handrail developed body 2. The tensile body 4 reinforces the handrail developed body 2 so as to prevent extension and breakage of the moving handrail 1 caused by the tension generated on the moving handrail 1 due to a load such as a passenger weight. As the tensile body 4, for example, a metal belt-like plate or a metal wire is used. In this embodiment, the tensile body 4 is formed of a steel belt-like plate.

The canvas 5 is, for example, fabric continuously provided on the inner surface of the core body 3 along the entire length of the handrail developed body 2. As the canvas 5, for example, synthetic fiber fabric formed of synthetic fibers such as polyethylene terephthalate (PET), cotton fabric formed of cotton, or the like is used. The canvas 5 is brought into contact with a guide member for guiding the moving handrail 1, to thereby reduce the frictional resistance generated when the moving handrail 1 moves. Further, the canvas 5 is brought into contact with a drive roller (not shown) of a handrail drive device for generating a drive force for moving the moving handrail 1, to thereby secure the frictional drive force.

The handrail developed body 2 is produced as follows. An extrudate having a predetermined length, in which the core body 3, the tensile body 4, and the canvas 5 are integrated, is obtained through extrusion, and both end portions of the obtained extrudate are processed into a predetermined shape (such as flat surfaces).

A device for manufacturing a handrail, which is configured to manufacture the endless moving handrail 1 by heating and connecting together both the end portions of the handrail developed body 2 (device for manufacturing a moving handrail for a passenger conveyor), includes a connection die 11, which is a metal die for heating and connecting together both the end portions of the handrail developed body 2, and a plurality of heaters (heat sources) (not shown) provided to the connection die 11, for heating the connection die 11.

The moving handrail 1 is manufactured by connecting together both the end portions of the handrail developed body 2 by pressurizing and heating the connection die 11 under a state in which both the end portions of the handrail developed body 2 are mated together without a gap inside the connection die 11. That is, the moving handrail 1 is manufactured by applying pressure and heat to both the end portions of the handrail developed body 2 from the connection die 11, to thereby integrate both the end portions of the handrail developed body 2 with each other while melting the thermoplastic elastomer of the core body 3.

The connection die 11 includes an inner die (inner core die) 12 to be inserted on the inner side of the handrail developed body 2, and an outer die 13 for collectively surrounding the handrail developed body 2 and the inner die 12. Further, the connection die 11 is mounted to both the end portions of the handrail developed body 2 under a state in which a boundary 6 between both the end portions of the handrail developed body 2 is covered with the inner die 12 and the outer die 13. Under a state in which the connection die 11 is mounted to both the end portions of the handrail developed body 2, the inner die 12 covers the canvas 5, and the outer die 13 covers the outer surface of the core body 3. In this embodiment, the connection die 11 is arranged in a manner that the longitudinal center positions of the inner die 12 and the outer die 13 are respectively matched with the position of the boundary 6 in the longitudinal direction of the handrail developed body 2. Further, in this embodiment, the inner die 12 and the outer die 13 are formed to have the same longitudinal dimension.

The inner die 12 has a shape conforming to the inner surface shape of the handrail developed body 2. The inner die 12 includes a pair of opposing dies 12a and an interposing die 12b to be interposed between the opposing dies 12a. The inner die 12 is inserted on the inner side of the handrail developed body 2 by inserting the pair of opposing dies 12a from an open part of the handrail developed body 2, and then inserting the interposing die 12b between the pair of opposing dies 12a.

The outer die 13 includes an upper die 13a and a lower die 13b for sandwiching the handrail developed body 2 and the inner die 12 from the outer side under a state in which the inner die 12 is inserted on the inner side of the handrail developed body 2. The handrail developed body 2 and the inner die 12 are collectively surrounded by the upper die 13a and the lower die 13b.

The heaters are buried in each of the inner die 12 and the outer die 13. The heaters are arrayed along the longitudinal direction of the connection die 11. The connection die 11 is heated based on the positions of the heaters through energization to the respective heaters.

In each of the inner die 12 and the outer die 13, a plurality of temperature sensors (not shown) for measuring the temperature are provided. The plurality of temperature sensors are provided at a plurality of positions in the longitudinal direction of each of the inner die 12 and the outer die 13. With this, in the connection die 11, the temperature of each of the inner die 12 and the outer die 13 can be measured at the plurality of positions in the longitudinal direction of each of the inner die 12 and the outer die 13.

The energization to the respective heaters provided in each of the inner die 12 and the outer die 13 is controlled individually by a temperature adjusting device (not shown) based on the temperature information measured by each temperature sensor. The heating temperature of the inner die 12 when both the end portions of the handrail developed body 2 are connected to each other is adjusted so as to continuously reduce from the longitudinal intermediate portion toward the longitudinal outer side of the inner die 12 by controlling energization to the respective heaters with the temperature adjusting device. The heating temperature of the outer die 13 when both the end portions of the handrail developed body 2 are connected to each other is also adjusted so as to continuously reduce from the longitudinal intermediate portion toward the longitudinal outer side of the outer die 13 by controlling energization to the respective heaters with the temperature adjusting device.

In the moving handrail 1, both the end portions of the handrail developed body 2 heated with the connection die 11 (in this embodiment, a part arranged inside the connection die 11) are formed as a handrail connection section 7, and the remaining part of the handrail developed body 2 remains as a handrail continuous section 8 without being heated with the connection die 11. In the handrail connection section 7, the thermoplastic elastomer of the core body 3, which has melted by being heated with the connection die 11, penetrates through the canvas 5 to be cured. Therefore, the penetration amount of the thermoplastic elastomer with respect to the canvas 5 is larger in the handrail connection section 7 than in the handrail continuous section 8. The bending stiffness of the moving handrail 1 becomes higher as the penetration amount of the thermoplastic elastomer with respect to the canvas 5 becomes larger. Therefore, the bending stiffness of the handrail connection section 7 is higher than the bending stiffness of the handrail continuous section 8.

In the handrail connection section 7, the heating temperature of the inner die 12 when both the end portions of the handrail developed body 2 are connected to each other is continuously reduced toward the longitudinal outer side of the inner die 12. Thus, the penetration amount of the thermoplastic elastomer with respect to the canvas 5 is continuously reduced from the longitudinal intermediate portion (part including the boundary 6) toward the longitudinal outer side of the handrail connection section 7. With this, the bending stiffness of the handrail connection section 7 is continuously reduced from the longitudinal intermediate portion toward the longitudinal outer side of the handrail connection section 7 to become close to the bending stiffness of the handrail continuous section 8. That is, in the moving handrail 1, the change (difference) in bending stiffness from the handrail connection section 7 toward the handrail continuous section 8 is gentle.

Next, the procedure when the moving handrail 1 is manufactured is described. When the moving handrail 1 is manufactured, the handrail developed body 2 having a predetermined length is produced in advance through extrusion. After that, the handrail developed body 2 is bent so as to obtain a state in which both the end portions of the handrail developed body 2 are mated together without a gap.

After that, the inner die 12 is inserted on the inner side of the handrail developed body 2, and then the handrail developed body 2 and the inner die 12 are sandwiched by the upper die 13a and the lower die 13b. In this manner, the connection die 11 is mounted onto both the end portions of the handrail developed body 2 under a state in which the boundary 6 between both the end portions of the handrail developed body 2 is covered.

After that, the plurality of heaters provided in the connection die 11 are energized to heat the connection die 11, and both the end portions of the handrail developed body 2 are heated and connected to each other. At this time, the temperature of each of the inner die 12 and the outer die 13 is adjusted so as to continuously reduce from the longitudinal intermediate portion toward the longitudinal outer side of each of the inner die 12 and the outer die 13 by individually controlling the energization to the respective heaters.

After both the end portions of the handrail developed body 2 are heated and connected to each other, the heating of the connection die 11 is stopped. After that, the thermoplastic elastomer of the core body 3 is cooled to be cured, and the moving handrail 1 is removed from the connection die 11. Thus, the endless moving handrail 1 is manufactured.

In such a moving handrail 1, the bending stiffness of the handrail connection section 7 is reduced from the longitudinal intermediate portion toward the longitudinal outer side of the handrail connection section 7. Therefore, the bending stiffness of the handrail connection section 7 becomes close to the bending stiffness of the handrail continuous section 8, which is positioned on both sides of the handrail connection section 7, at both the end portions of the handrail connection section 7. Further, it is possible to prevent the bending stiffness from being drastically changed at the boundary part between the handrail connection section 7 and the handrail continuous section 8. With this, it is possible to suppress the occurrence of local deformation or stress concentration at the boundary part between the handrail connection section 7 and the handrail continuous section 8, and the moving handrail 1 can have a longer life.

Further, the heating temperature when both the end portions of the handrail developed body 2 are connected to each other is continuously reduced from the longitudinal intermediate portion toward the longitudinal outer side of the inner die 12. Thus, the bending stiffness of the handrail connection section 7 is continuously reduced from the longitudinal intermediate portion toward the longitudinal outer side of the handrail connection section 7. In this manner, the bending stiffness of the handrail connection section 7 can be adjusted finely in the longitudinal direction of the handrail connection section 7, and the bending stiffness of the handrail connection section 7 can be changed more smoothly. With this, it is possible to further suppress the occurrence of local deformation or stress concentration of the moving handrail 1, and the moving handrail 1 can have a longer life. Further, simultaneously with the heating and connecting of both the end portions of the handrail developed body 2 with the connection die 11, the bending stiffness of the handrail connection section 7 can be adjusted. With this, the work when both the end portions of the handrail developed body 2 are heated and connected to each other can be prevented from being complicated.

Note that, in the above-mentioned embodiment, the heating temperature of each of the inner die 12 and the outer die 13 is adjusted so as to continuously reduce from the longitudinal intermediate portion toward the longitudinal outer side of each of the inner die 12 and the outer die 13. Alternatively, only the heating temperature of the inner die 12 may be adjusted so as to continuously reduce from the longitudinal intermediate portion toward the longitudinal outer side of the inner die 12.

Second Embodiment

Figure 2:
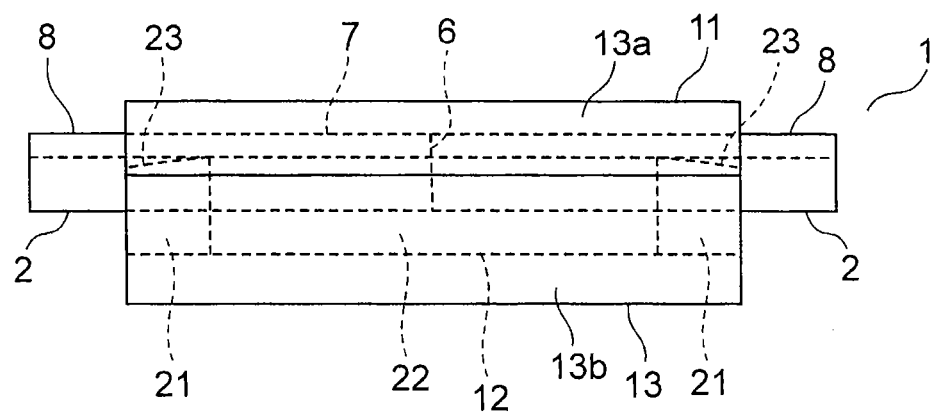
FIG. 2 is a side view illustrating a state in which a moving handrail for a passenger conveyor according to a second embodiment of the present invention is manufactured.

FIG. 2 is a side view illustrating a state in which a moving handrail for a passenger conveyor according to a second embodiment of the present invention is manufactured. In FIG. 2, the inner die 12 includes a pair of end inserting portions 21 positioned at both the longitudinal end portions of the inner die 12, and an intermediate inserting portion 22 arranged between the pair of end inserting portions 21 (that is, at the longitudinal intermediate portion of the inner die 12). That is, both longitudinal end portions of each of the opposing dies 12a and the interposing die 12b are formed as the pair of end inserting portions 21, and the longitudinal intermediate portion of each of the opposing dies 12a and the interposing die 12b is formed as the intermediate inserting portion 22.

The thermal conductivity of the material for forming each of the pair of end inserting portions 21 is lower than the thermal conductivity of the material for forming the intermediate inserting portion 22. In this embodiment, the same material is used for forming the pair of end inserting portions 21. As the material for forming the intermediate inserting portion 22, for example, an iron-based material or the like is used, and as the material for forming each of the end inserting portions 21, for example, a titanium-based material or the like is used.

Both the longitudinal end portions of the inner die 12 each have a tapered surface 23 formed thereon, which inclines in a direction to separate from the inner surface of the handrail developed body 2 toward the longitudinal outer side of the inner die 12. In this embodiment, the tapered surface 23 is formed on each of the end inserting portions 21.

In this embodiment, in the inner die 12 and the outer die 13, no heaters are provided in the inner die 12, but the heaters are provided only in the outer die 13. With this, the inner die 12 is heated by the heat transmitted from the outer die 13. Further, in this embodiment, the temperature of the outer die 13 is adjusted by controlling the energization to the heaters. However, unlike the first embodiment, the control of the energization to the heaters so that the temperature of the outer die 13 is reduced from the longitudinal intermediate portion toward the longitudinal outer side of the outer die 13 is not carried out.

In this embodiment, the thermal conductivity of the material for forming each of the end inserting portions 21 is set lower than the thermal conductivity of the material for forming the intermediate inserting portion 22, and each of the end inserting portions 21 has the tapered surface 23 formed thereon. Therefore, the heating temperature when both the end portions of the handrail developed body 2 are connected to each other is continuously reduced from the longitudinal intermediate portion toward the longitudinal outer side of the connection die 11. Other configurations and the method of manufacturing the moving handrail 1 are similar to those in the first embodiment.

In such a device for manufacturing a moving handrail, the inner die 12 includes the pair of end inserting portions 21 positioned at both the longitudinal end portions of the inner die 12, and the intermediate inserting portion 22 arranged between the pair of end inserting portions 21, and the thermal conductivity of the material for forming each of the end inserting portions 21 is lower than that of the material for forming the intermediate inserting portion 22. Therefore, even without finely controlling the energization to the plurality of heaters, the heating temperature when both the end portions of the handrail developed body 2 are connected to each other can be reduced from the longitudinal intermediate portion toward the longitudinal outer side of the connection die 11. With this, the function of the temperature adjusting device for adjusting the temperature of the connection die 11 can be simplified, and the cost can be reduced.

Further, the tapered surfaces 23, which incline in the direction to separate from the inner surface of the handrail developed body 2 toward the longitudinal outer side of the inner die 12, are formed on the pair of end inserting portions 21 positioned at both the longitudinal end portions of the inner die 12. Therefore, the amount of heat to be transmitted from the inner die 12 to the handrail developed body 2 can be continuously reduced toward the longitudinal outer side of the inner die 12. With this, the penetration amount of the thermoplastic elastomer with respect to the canvas 5 can be changed more smoothly in the handrail connection section 7 toward the longitudinal outer side of the handrail connection section 7. Thus, the bending stiffness of the handrail connection section 7 can be changed more smoothly.

Note that, in the above-mentioned embodiment, the tapered surfaces 23 are formed on the pair of end inserting portions 21, but the tapered surfaces 23 may be omitted. Even when the tapered surface 23 is not formed on each of the end inserting portions 21, because the thermal conductivity of the material for forming each of the end inserting portions 21 is lower than that of the intermediate inserting portion 22, the heating temperature can be reduced from the longitudinal intermediate portion toward the longitudinal outer side of the inner die 12. Therefore, the bending stiffness can be prevented from being drastically changed at the boundary part between the handrail connection section 7 and the handrail continuous section 8, and the moving handrail 1 can have a longer life.

Further, in the above-mentioned embodiment, the inner die 12 includes the end inserting portions 21 and the intermediate inserting portion 22 that are made of materials having different thermal conductivities from each other, but the entire inner die 12 may be made of the same material. Even when the inner die 12 is not divided into the intermediate inserting portion 22 and the pair of end inserting portions 21, if the tapered surfaces 23 are formed on both the longitudinal end portions of the inner die 12, the amount of heat to be transmitted from the inner die 12 to the handrail developed body 2 can be continuously reduced toward the longitudinal outer side of the inner die 12. Therefore, the bending stiffness can be prevented from being drastically changed at the boundary part between the handrail connection section 7 and the handrail continuous section 8, and the moving handrail 1 can have a longer life.

Further, in the above-mentioned embodiment, the same material is used for forming the pair of end inserting portions 21. However, as long as the material for forming each of the end inserting portions 21 has a thermal conductivity lower than that of the material for forming the intermediate inserting portion 22, different materials may be used for forming one end inserting portion 21 and the other end inserting portion 21, respectively.

Further, in the above-mentioned embodiment, the heaters are provided to only the outer die 13, but the heaters may also be provided to the inner die 12.

Further, in the above-mentioned embodiment, the control of energization to the heaters so that the temperature of the outer die 13 is reduced from the longitudinal intermediate portion toward the longitudinal outer side of the outer die 13 is not carried out, but similarly to the first embodiment, the energization to the heaters may be controlled so that the temperature of the outer die 13 is reduced from the longitudinal intermediate portion toward the longitudinal outer side of the outer die 13.

Third Embodiment

Figure 3:
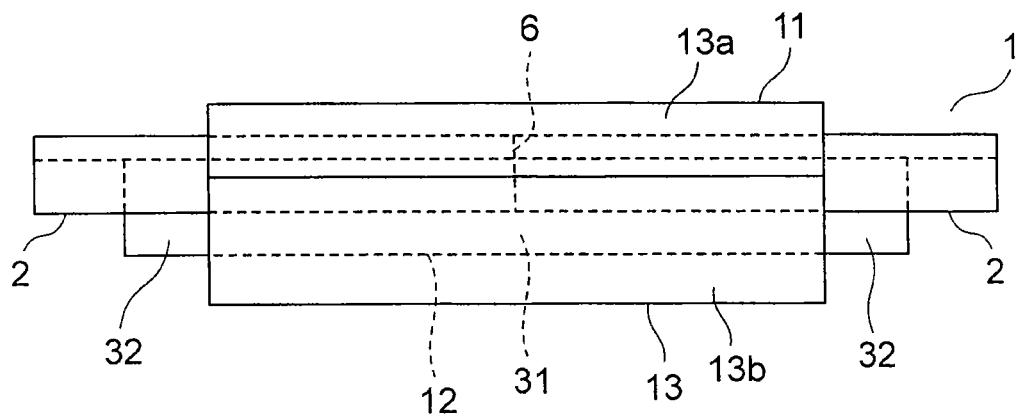
FIG. 3 is a side view illustrating a state in which a moving handrail for a passenger conveyor according to a third embodiment of the present invention is manufactured.

FIG. 3 is a side view illustrating a state in which a moving handrail for a passenger conveyor according to a third embodiment of the present invention is manufactured. In FIG. 3, the longitudinal dimension of the inner die 12 is larger than the longitudinal dimension of the outer die 13. Further, the longitudinal intermediate portion of the inner die 12 is arranged inside the outer die 13, and both the longitudinal end portions of the inner die 12 are respectively protruded toward a longitudinal outer side from both longitudinal end surfaces of the outer die 13. With this, the inner die 12 is arranged while being divided into an accommodated portion (longitudinal intermediate portion of the inner die 12) 31, which is positioned within the longitudinal range of the outer die 13, and a pair of protruding portions (both the longitudinal end portions of the inner die 12) 32 that respectively protrude from both the longitudinal end surfaces of the outer die 13. The heaters are provided to both of the inner die 12 and the outer die 13 so as to avoid the respective protruding portions 32.

The pair of protruding portions 32 of the inner die 12 is exposed from the outer die 13, and hence the heat of the protruding portions 32 easily dissipates to the outside. With this, the increase in temperature of each of the protruding portions 32 is suppressed as the distance from the outer die 13 increases. Further, in parts of the handrail developed body 2 in which the respective protruding portions 32 are inserted, although the parts are positioned outside of the range of the outer die 13, the heat from the protruding portions 32 is transmitted. Therefore, the penetration amount of the thermoplastic elastomer with respect to the canvas 5 is continuously reduced from the accommodated portion 31 toward the longitudinal outer side of the inner die 12. With this, the bending stiffness of the moving handrail 1 is continuously reduced from the longitudinal intermediate portion toward the longitudinal outer side of the handrail connection section 7. Other configurations and the method of manufacturing the moving handrail 1 are similar to those in the second embodiment.

In such a device for manufacturing a moving handrail, the inner die 12 is protruded from the outer die 13 toward the longitudinal outer side, and the heaters for heating the connection die 11 are provided so as to avoid the respective protruding portions 32 of the inner die 12. Therefore, even without finely controlling the energization to the heaters, the heat is dissipated outside from the respective protruding portions 32, and thus the increase in temperature of both the longitudinal end portions of the connection die 11 can be suppressed as the distance from the outer die 13 increases. Further, the parts of the handrail developed body 2 in which the respective protruding portions 32 are inserted are positioned outside of the range of the outer die 13, and hence it is possible to reduce the amount of heat to be transmitted from the outer die 13 to the parts of the handrail developed body 2 in which the respective protruding portions 32 are inserted. With this, the amount of heat to be transmitted from the connection die 11 to the handrail developed body 2 can be continuously reduced from the longitudinal intermediate portion toward the longitudinal outer side of the connection die 11. Therefore, the bending stiffness can be prevented from being drastically changed at the boundary part between the handrail connection section 7 and the handrail continuous section 8, and the moving handrail 1 can have a longer life.

Note that, in the above-mentioned embodiment, the heaters are provided to both of the inner die 12 and the outer die 13, but the heaters may be provided to only one of the inner die 12 and the outer die 13.

Fourth Embodiment

Figure 4:
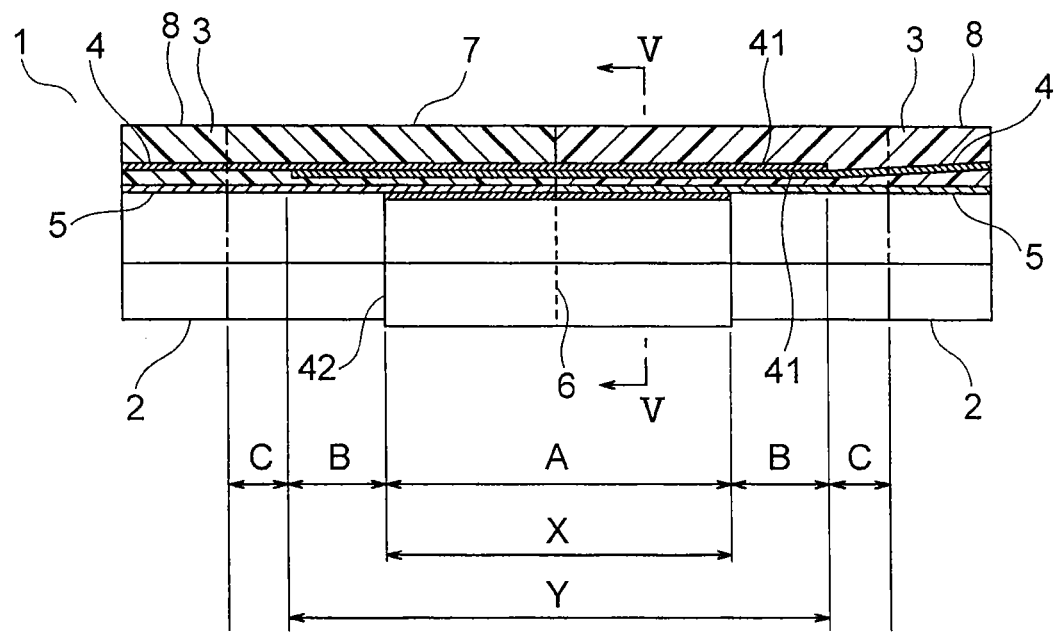
FIG. 4 is a side view illustrating a handrail connection section of a moving handrail for a passenger conveyor according to a fourth embodiment of the present invention.
Figure 5:
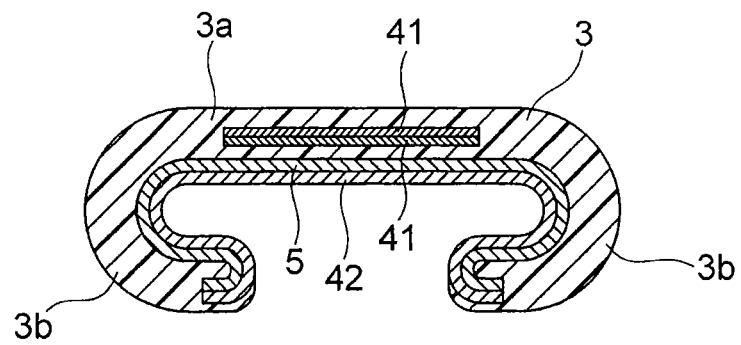
FIG. 5 is a sectional view taken along the line V-V of FIG. 4.

FIG. 4 is a side view illustrating a handrail connection section 7 of a moving handrail for a passenger conveyor according to a fourth embodiment of the present invention. Further, FIG. 5 is a sectional view taken along the line V-V of FIG. 4. In FIG. 4, in the handrail connection section 7, both end portions of the plate-like tensile body 4 are overlapped with each other in the thickness direction of the tensile body 4 (direction perpendicular to the longitudinal direction of the handrail connection section 7) as overlapping portions 41.

The boundary 6 between both the end portions of the handrail developed body 2 matches with the boundary between both the end portions of each of the core body 3 and the canvas 5. Each of the overlapping portions 41 of the tensile body 4 is arranged across the boundary 6 between both the end portions of the handrail developed body 2. That is, the boundary 6 between both the end portions of the handrail developed body 2 is positioned within the longitudinal range of each of the overlapping portions 41.

The inner surface of the handrail connection section 7 and the boundary 6 between the end portions of the canvas 5 are covered with reinforcement fabric 42 for reinforcing the handrail developed body 2. The thermoplastic elastomer of the core body 3 penetrates through the reinforcement fabric 42 to be cured by the heat generated when both the end portions of the handrail developed body 2 are heated and connected to each other.

A longitudinal dimension X of the reinforcement fabric 42 is smaller than a longitudinal dimension Y of the overlapping portion 41. Further, the reinforcement fabric 42 is arranged within the longitudinal range of each of the overlapping portion 41. With this, the distribution in the longitudinal direction of the canvas 5, the overlapping portions 41, and the reinforcement fabric 42 in the handrail connection section 7 is divided into an innermost range A, an intermediate range B, and an outermost range C. In the innermost range A, all of the canvas 5, the overlapping portions 41, and the reinforcement fabric 42 are arranged. The intermediate range B is positioned on the longitudinal outer side of the innermost range A. In the intermediate range B, among the canvas 5, the overlapping portions 41, and the reinforcement fabric 42, only the canvas 5 and the overlapping portions 41 are arranged. The outermost range C is positioned on the longitudinal outer side of the intermediate range B. In the outermost range C, among the canvas 5, the overlapping portions 41, and the reinforcement fabric 42, only the canvas 5 is arranged. With this, the bending stiffness of the handrail connection section 7 is reduced in stages from the longitudinal intermediate portion of the handrail connection section 7 arranged in the innermost range A toward the longitudinal outer side in the order of the intermediate range B and the outermost range C. Other configurations are similar to those in the first embodiment.

Next, the procedure when the moving handrail 1 is manufactured is described. When the moving handrail 1 is manufactured, the handrail developed body 2 having a predetermined length is produced in advance through extrusion. At this time, at both the end portions of the handrail developed body 2, end portions of the tensile body 4 are protruded from end surfaces of the core body 3, and slits are formed from the end surfaces of the core body 3 along the tensile body 4.

After that, the handrail developed body 2 is bent so as to obtain a state in which both the end portions of the handrail developed body 2 are mated together without a gap. At this time, both the end portions of the handrail developed body 2 are mated together without a gap while the end portion of the tensile body 4 on one side is inserted through the slit formed in the end surface of the core body 3 on the other side, and the end portion of the tensile body 4 on the other side is inserted through the slit formed in the end surface of the core body 3 on the one side. With this, the boundary 6 is formed between both the end portions of each of the core body 3 and the canvas 5, and both the end portions of the tensile body 4 are overlapped with each other in the thickness direction of the tensile body 4 across the boundary 6, to thereby form the overlapping portions 41.

After that, the reinforcement fabric 42 is bonded with an adhesive to the inner surface of the handrail developed body 2 so as to cover the boundary 6 between the end portions of the canvas 5. At this time, the reinforcement fabric 42 is arranged within the longitudinal range of each of the overlapping portions 41.

After that, the inner die 12 is inserted on the inner side of the handrail developed body 2 so as to cover the reinforcement fabric 42. Then, the handrail developed body 2 and the inner die 12 are sandwiched between the upper die 13a and the lower die 13b, to thereby mount the connection die 11 to both the end portions of the handrail developed body 2 under a state in which the boundary 6 between both the end portions of the handrail developed body 2 is covered. The subsequent procedure is similar to that in the first embodiment.

In such a moving handrail 1, the longitudinal dimension of the reinforcement fabric 42 is smaller than the longitudinal dimension of the overlapping portions 41 of the tensile body 4, and the reinforcement fabric 42 is arranged within the longitudinal range of each of the overlapping portions 41 of the tensile body 4. Therefore, the distribution of the canvas 5, the overlapping portions 41, and the reinforcement fabric 42 in the handrail connection section 7 can be reduced from the longitudinal intermediate portion toward the longitudinal outer side of the handrail connection section 7 in the order of the innermost range A in which all of the canvas 5, the overlapping portions 41, and the reinforcement fabric 42 are arranged, the intermediate range B in which only the canvas 5 and the overlapping portions 41 are arranged, and the outermost range C in which only the canvas 5 is arranged. With this, the bending stiffness of the handrail connection section 7 can be reduced in stages from the longitudinal intermediate portion toward the longitudinal outer side of the handrail connection section 7 in the order of the innermost range A, the intermediate range B, and the outermost range C. Therefore, the bending stiffness of the handrail connection section 7 becomes closer to the bending stiffness of the handrail continuous section 8 positioned on both sides of the handrail connection section 7 at both the longitudinal end portions of the handrail connection section 7, and the bending stiffness can be prevented from being drastically changed at the boundary part between the handrail connection section 7 and the handrail continuous section 8.

Note that, in the above-mentioned embodiment, both the end portions of the tensile body 4, which are overlapped with each other in the thickness direction of the tensile body 4, serve as the overlapping portions 41. Alternatively, inclined surfaces, which incline with respect to the width direction of the tensile body 4, may be formed on both the end portions of the tensile body 4, and the inclined surfaces may be mated together so that both the end portions of the tensile body 4 are overlapped with each other in the width direction of the tensile body 4 as the overlapping portions.

When both the end portions of the tensile body 4 are overlapped with each other in the width direction of the tensile body 4 by forming the inclined surfaces on both the end portions of the tensile body 4, in order to reinforce both the overlapped end portions of the tensile body 4, additional charging of a resin or pouring of an adhesive is carried out. Therefore, the bending stiffness of the handrail connection section 7 is increased at both the end portions of the tensile body 4, which are overlapped with each other in the width direction of the tensile body 4. However, also in this case, it is possible to reduce the bending stiffness of the handrail connection section 7 in stages from the longitudinal intermediate portion toward the longitudinal outer side of the handrail connection section 7 in the order of the innermost range A, the intermediate range B, and the outermost range C.

Fifth Embodiment

Figure 6:
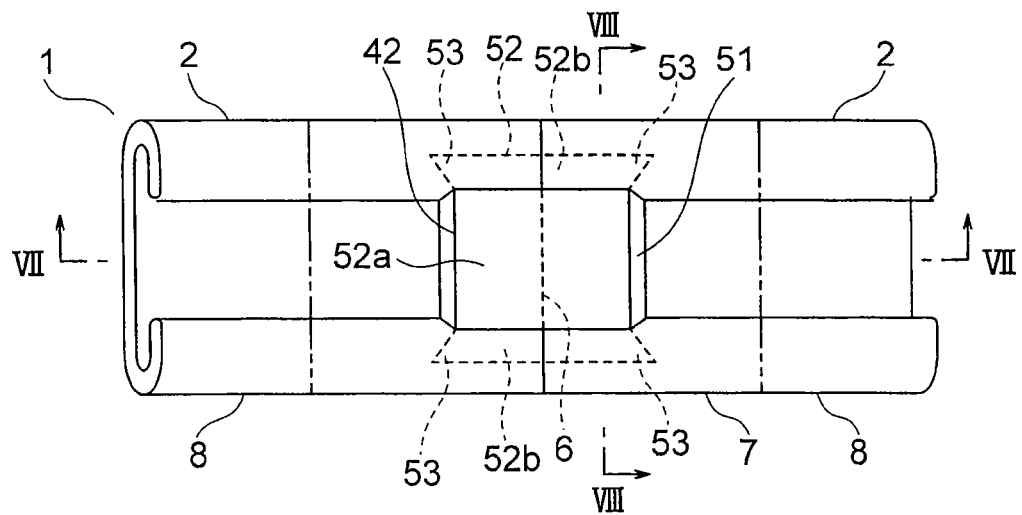
FIG. 6 is a bottom view illustrating a handrail connection section of a moving handrail for a passenger conveyor according to a fifth embodiment of the present invention.
Figure 7:
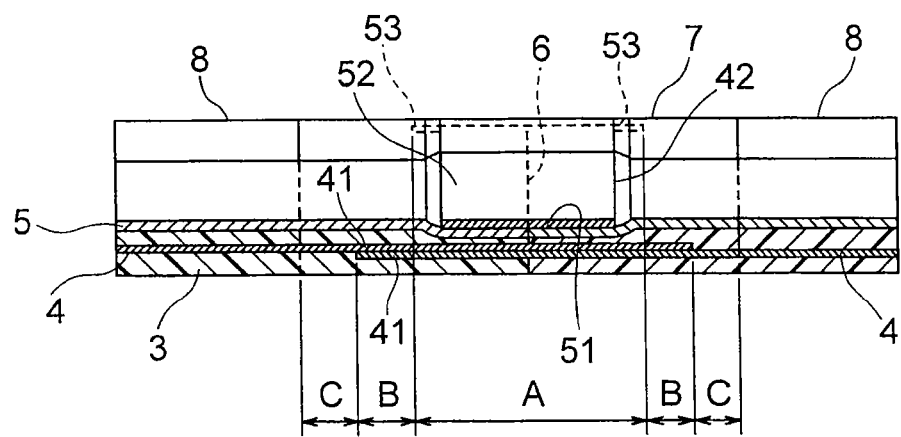
FIG. 7 is a sectional view taken along the line VII-VII of FIG. 6.
Figure 8:
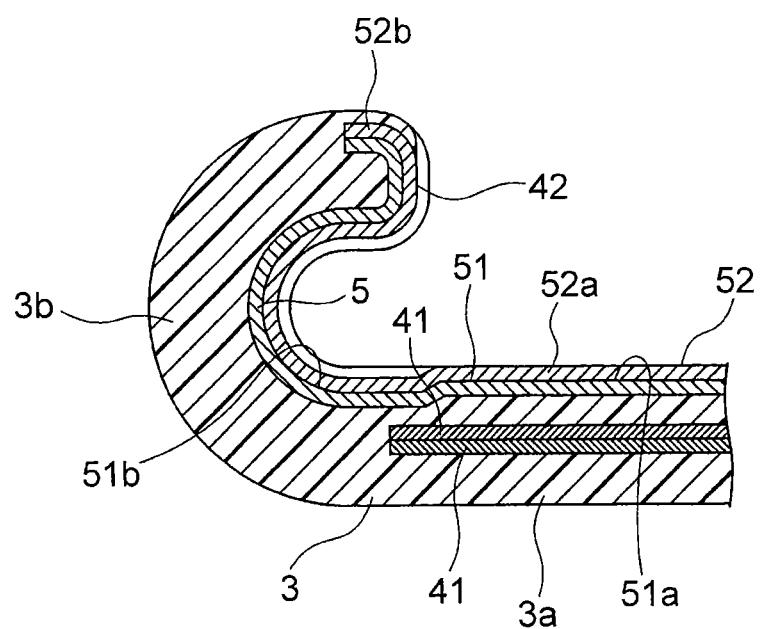
FIG. 8 is a sectional view taken along the line VIII-VIII of FIG. 6.

FIG. 6 is a bottom view illustrating a handrail connection section 7 of a moving handrail for a passenger conveyor according to a fifth embodiment of the present invention. Further, FIG. 7 is a sectional view taken along the line VII-VII of FIG. 6, and FIG. 8 is a sectional view taken along the line VIII-VIII of FIG. 6. In FIGS. 6 to 8, a recessed portion 51 is formed in the inner surface of the handrail developed body 2. The boundary 6 between the end portions of the canvas 5 is positioned within a longitudinal range of the recessed portion 51. The recessed portion 51 is formed by recessing the inner surface of the core body 3.

As illustrated in FIG. 6, the reinforcement fabric 42 includes a reinforcement fabric main body portion 52 having the same width dimension in the longitudinal direction, and a plurality of (in this embodiment, four) selvage portions 53 that protrude from both the longitudinal end portions of the reinforcement fabric main body portion 52.

As illustrated in FIG. 8, the reinforcement fabric main body portion 52 includes a bonded portion 52a provided to the recessed portion 51, and a pair of buried portions 52b respectively provided to both the end portions of the bonded portion 52a in the width direction of the reinforcement fabric main body portion 52. The pair of buried portions 52b is buried inside the curved portions 3b of the core body 3 together with the canvas 5.

As illustrated in FIG. 6, the selvage portions 53 protrude toward the longitudinal outer side of the reinforcement fabric 42 from both the longitudinal end portions of each of the buried portions 52b. With this, the width dimension of each of the selvage portions 53 is smaller than the width dimension of the reinforcement fabric main body portion 52. In this embodiment, the width dimension of each of the selvage portions 53 is continuously reduced toward the longitudinal outer side of the reinforcement fabric 42.

As illustrated in FIG. 8, the recessed portion 51 includes a recessed portion flat part 51a formed in the flat portion 3a, and a pair of recessed portion curved parts 51b formed respectively in the curved portions 3b. The depth of each of the recessed portion curved parts 51b is larger than the depth of the recessed portion flat part 51a.

The thickness of the bonded portion 52a of the reinforcement fabric 42 is the same as the depth of the recessed portion flat part 51a. Therefore, as illustrated in FIG. 8, the inner surface of the bonded portion 52a in the recessed portion flat part 51a is arranged so as to be flush with the inner surface of the canvas 5 in the flat portion 3a outside of the recessed portion 51, and the inner surface of the bonded portion 52a in the recessed portion curved part 51b is arranged at a position deeper than the inner surface of the canvas 5 in the curved portion 3b outside of the recessed portion 51.

Similarly to the fourth embodiment, the distribution of the canvas 5, the overlapping portions 41, and the reinforcement fabric 42 in the handrail connection section 7 is reduced from the longitudinal intermediate portion toward the longitudinal outer side of the handrail connection section 7 in the order of the innermost range A in which all of the canvas 5, the overlapping portions 41, and the reinforcement fabric 42 are arranged, the intermediate range B in which only the canvas 5 and the overlapping portions 41 are arranged, and the outermost range C in which only the canvas 5 is arranged. With this, the bending stiffness of the handrail connection section 7 is reduced in stages from the longitudinal intermediate portion toward the longitudinal outer side of the handrail connection section 7 in the order of the innermost range A, the intermediate range B, and the outermost range C.

Further, the bending stiffness of the handrail connection section 7 in the innermost range A is continuously reduced toward the longitudinal outer side of the handrail connection section 7 by continuously reducing the width dimension of each of the selvage portions 53 that protrude from both the longitudinal end portions of the reinforcement fabric main body portion 52. Other configurations and the method of manufacturing the moving handrail 1 are similar to those in the fourth embodiment.

In such a moving handrail 1, the recessed portion 51 is formed in the inner surface of the handrail developed body 2, and at least a part of the reinforcement fabric 42 is formed in the recessed portion 51. Therefore, the increase in bending stiffness of the handrail connection section 7 due to the formation of the reinforcement fabric 42 can be suppressed by reducing the thickness of the core body 3 by the recessed portion 51. With this, in a part between the innermost range A in which all of the canvas 5, the overlapping portions 41, and the reinforcement fabric 42 are arranged and the intermediate range B in which only the canvas 5 and the overlapping portions 41 are arranged, the change in bending stiffness of the handrail connection section 7 can be reduced, and the change in bending stiffness of the handrail connection section 7 can be set more gentle from the longitudinal intermediate portion toward the longitudinal outer side of the handrail connection section 7.

Further, the width dimension of each of the plurality of selvage portions 53 that protrude from both the longitudinal end portions of the reinforcement fabric main body portion 52 of the reinforcement fabric 42 is reduced toward the longitudinal outer side of the reinforcement fabric 42. Therefore, the bending stiffness of the handrail connection section 7 can be continuously reduced toward the longitudinal outer side in parts in which the selvage portions 53 are arranged. With this, in a part between the innermost range A in which all of the canvas 5, the overlapping portions 41, and the reinforcement fabric 42 are arranged and the intermediate range B in which only the canvas 5 and the overlapping portions 41 are arranged, the change in bending stiffness of the handrail connection section 7 can be further reduced, and the change in bending stiffness of the handrail connection section 7 can be set more gentle from the longitudinal intermediate portion toward the longitudinal outer side of the handrail connection section 7.

Note that, in the above-mentioned embodiment, the depth of the recessed portion curved part 51b of the recessed portion 51 is larger than the depth of the recessed portion flat part 51a, but the recessed portion curved part 51b and the recessed portion flat part 51a may be formed into the same depth.

Further, in the above-mentioned embodiment, the depth of the recessed portion flat part 51a is the same as the thickness of the reinforcement fabric 42, but the depth of the recessed portion flat part 51a may be larger than the thickness of the reinforcement fabric 42, or may be smaller than the thickness of the reinforcement fabric 42.

Further, in the above-mentioned embodiment, the depth of the recessed portion curved part 51b is larger than the thickness of the reinforcement fabric 42, but the depth of the recessed portion curved part 51b may be the same as the thickness of the reinforcement fabric 42, or may be smaller than the thickness of the reinforcement fabric 42.

Further, in the above-mentioned embodiment, the selvage portions 53 protrude from both the longitudinal end portions of the buried portion 52b of the reinforcement fabric main body portion 52, but the selvage portions 53 may protrude from both the longitudinal end portions of the bonded portion 52a of the reinforcement fabric main body portion 52.

Further, in the above-mentioned embodiment, the width dimension of the selvage portion 53 is continuously reduced toward the longitudinal outer side of the reinforcement fabric 42, but as long as the width dimension of the selvage portion 53 is smaller than the width dimension of the reinforcement fabric main body portion 52, the width dimension of the selvage portion 53 may be constant in the longitudinal direction of the reinforcement fabric 42.

Further, in the fourth and fifth embodiments, the entire boundary 6 between the end portions of the canvas 5 is covered with the reinforcement fabric 42, but only a part of the boundary 6 between the end portions of the canvas 5 may be covered with the reinforcement fabric 42. For example, only a part of the boundary 6 between the end portions of the canvas 5, which is formed in each of the curved portions 3b, may be covered with the reinforcement fabric 42.

Further, in the fourth and fifth embodiments, the temperature of the connection die 11 when both the end portions of the handrail developed body 2 are heated and connected to each other may be constant in the longitudinal direction of the connection die 11. Alternatively, similarly to the first embodiment, the temperature of the connection die 11 may be adjusted so as to reduce from the longitudinal intermediate portion toward the longitudinal outer side of the connection die 11.

Further, the connection die 11 of the second embodiment or the third embodiment may be applied to the connection die 11 of the first embodiment. Further, instead of the connection die 11 of the first embodiment, the connection die 11 of the second embodiment or the third embodiment may be used to manufacture the moving handrail 1 of the fourth embodiment or the fifth embodiment.

The invention claimed is:

1. A moving handrail for a passenger conveyor, which has an endless structure formed by heating and connecting together both end portions of a handrail developed body into a handrail connection section with a connection die,
the handrail developed body comprising:
a core body that is made of a thermoplastic elastomer and has a substantially C-shaped cross section;
a tensile body arranged inside the core body along a longitudinal direction of the core body; and
a canvas arranged on an inner surface of the core body,
the handrail connection section having a bending stiffness that is reduced from a longitudinal intermediate portion toward a longitudinal outer side of the handrail connection section,
wherein, in the handrail connection section, both end portions of the tensile body are overlapped with each other as overlapping portions, and at least a part of a boundary between end portions of the canvas is covered with reinforcement fabric, and
wherein a longitudinal dimension of the reinforcement fabric is set smaller than a longitudinal dimension of each of the overlapping portions to arrange the reinforcement fabric within a longitudinal range of each of the overlapping portions, to thereby reduce the bending stiffness of the handrail connection section from the longitudinal intermediate portion toward the longitudinal outer side of the handrail connection section.

2. A moving handrail for a passenger conveyor according to claim 1,
wherein the handrail developed body has a recessed portion formed in an inner surface thereof, and
wherein at least a part of the reinforcement fabric is provided in the recessed portion.

3. A moving handrail for a passenger conveyor according to claim 1, wherein the reinforcement fabric comprises:
a reinforcement fabric main body portion; and
selvage portions protruding from both longitudinal end portions of the reinforcement fabric main body portion toward a longitudinal outer side of the reinforcement fabric, the selvage portions each having a width dimension smaller than a width dimension of the reinforcement fabric main body portion.

4. A moving handrail for a passenger conveyor according to claim 1,
wherein the connection die comprises:
an inner die to be inserted on an inner side of the handrail developed body so as to cover a boundary between both the end portions of the handrail developed body; and
an outer die for collectively surrounding the handrail developed body and the inner die, and
wherein a heating temperature when both the end portions of the handrail developed body are connected to each other is reduced from a longitudinal intermediate portion toward a longitudinal outer side of the inner die, to thereby reduce the bending stiffness of the handrail connection section from the longitudinal intermediate portion toward the longitudinal outer side of the handrail connection section.

5. A device for manufacturing a moving handrail for a passenger conveyor, the device being configured to manufacture an endless moving handrail for a passenger conveyor by heating and connecting together both end portions of a handrail developed body,
the handrail developed body comprising:
a core body that is made of a thermoplastic elastomer and has a substantially C-shaped cross section;
a tensile body arranged inside the core body along a longitudinal direction of the core body; and
a canvas arranged on an inner surface of the core body,
the device comprising a connection die for heating and connecting together both the end portions of the handrail developed body,
the connection die comprising:
an inner die to be inserted on an inner side of the handrail developed body so as to cover a boundary between both the end portions of the handrail developed body; and
an outer die for collectively surrounding the handrail developed body and the inner die,
wherein a heating temperature, when both the end portions of the handrail developed body are connected to each other, is reduced from a longitudinal intermediate portion toward a longitudinal outer side of the inner die, and
wherein both longitudinal end portions of the inner die each have a tapered surface formed thereon, the tapered surface inclining in a direction to separate from the handrail developed body toward the longitudinal outer side of the inner die.

6. A device for manufacturing a moving handrail for a passenger conveyor according to claim 5,
wherein the inner die comprises:
a pair of end inserting portions positioned at both longitudinal end portions of the inner die; and
an intermediate inserting portion arranged between the pair of end inserting portions, and
wherein a thermal conductivity of a material for forming each of the pair of end inserting portions is smaller than a thermal conductivity of a material for forming the intermediate inserting portion.

7. A device for manufacturing a moving handrail for a passenger conveyor according to claim 5,
  wherein both longitudinal end portions of the inner die protrude from the outer die toward the longitudinal outer side, and
  wherein the device further comprises a heat source for heating the connection die, the heat source being arranged so as to avoid parts of the inner die, which protrude from the outer die.

* * * * *